United States Patent [19]

Miyamoto

[11] Patent Number: 4,787,430
[45] Date of Patent: Nov. 29, 1988

[54] DUPLICATING ROUTER

[75] Inventor: Kouichi Miyamoto, Hiroshima, Japan

[73] Assignee: Ryobi Ltd., Hiroshima, Japan

[21] Appl. No.: 59,654

[22] Filed: Jun. 8, 1987

[30] Foreign Application Priority Data

Feb. 23, 1987 [JP] Japan .............................. 62-25992[U]
Feb. 23, 1987 [JP] Japan .................................. 62-41181

[51] Int. Cl.⁴ ................................................ B27C 5/00
[52] U.S. Cl. ............................ 144/144 R; 144/134 R; 144/137; 409/89; 409/108; 409/124; 409/182
[58] Field of Search .................... 409/87, 89, 124, 108, 409/182; 144/134 R, 134 D, 136 R, 136 C, 144 R, 137

[56] References Cited

U.S. PATENT DOCUMENTS 3,739,824 6/1973 Hoenig ............................. 144/144 R
4,509,572 4/1985 L'Archer ............................. 144/137

*Primary Examiner*—W. Donald Bray
*Attorney, Agent, or Firm*—Sughrue, Mion, Zinn, Macpeak, and Seas

[57] ABSTRACT

A duplicating router of the type in which a cutter unit provided with a motor and a cutter is fed vertically and horizontally with respect to a base. A cutter unit feeding screw rod is installed parallel with guide bars and rotates for operation on a vertical guide frame formed through framing left and right guides fitted movably up and down in elongated guide grooves provided on vertical guide plates fixed on both sides of the base and two parallel guide bars supporting the cutter unit for movement to the left and right, thus forming a screw feeding means. A link handle in a link motion is connected between the base and the left and right guides, thus forming a link feeding means. A template is fixed on upper portions of the vertical guide plates. A duplicating recessed groove is formed in the template in the direction orthogonal to an upper surface of the base. A guide in holder is provided upright from the cutter unit to form a guide pin parallel with the horizontal shaft of the cutter unit and fit in the duplicating recessed groove. A compression spring cushions the guide pin against the recessed groove.

9 Claims, 8 Drawing Sheets

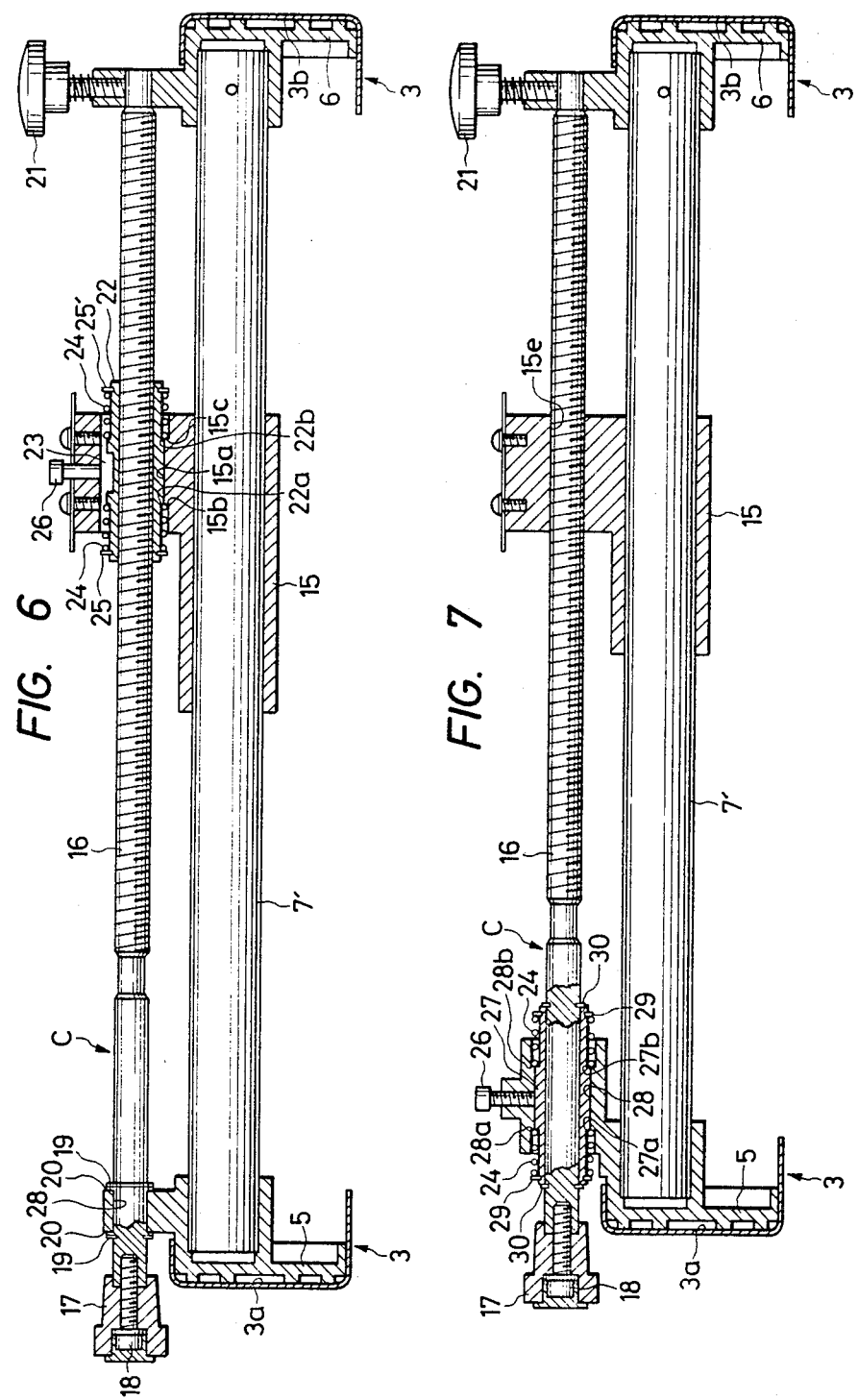

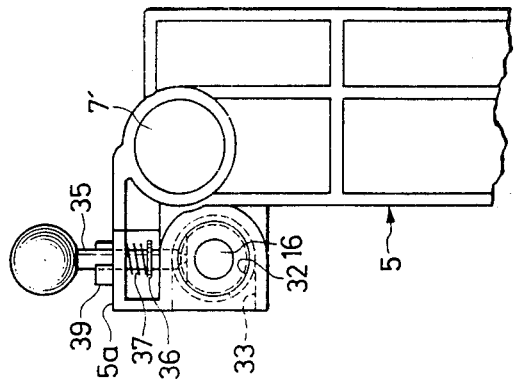
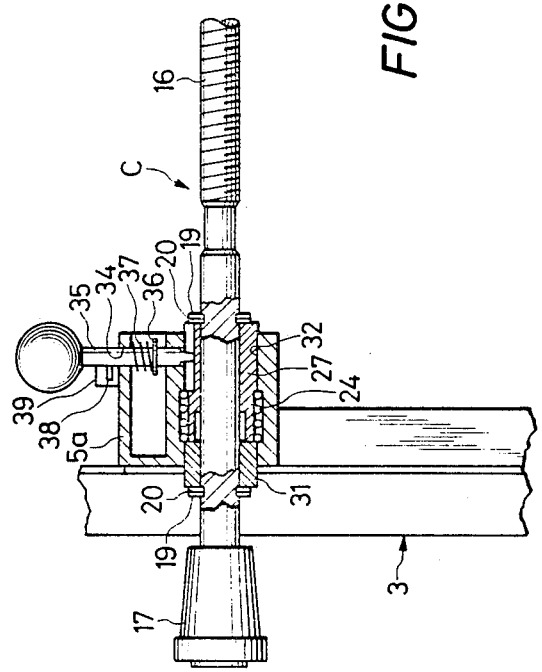
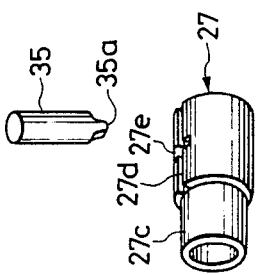

DUPLICATING ROUTER

BACKGROUND OF THE INVENTION

1. Field of the Invention

The present invention relates to a duplicating router for duplicating a flat groove, a dovetail groove and the like on a workpiece. The router operates by feeding a cutter unit provided with a motor and cutters such as bit and the like interlocked on a chuck of a horizontal shaft. The cutter unit is fed vertically and horizontally with reference to a base.

2. Background of the Invention

In a woodworking machine, there has been well known hitherto a type provided with a guide plate, which is used to shift a workpiece.

However, since it is difficult for operators to visually ensure a guide plate and a cutter for the workpiece instantaneously and alternately, a large-scale guide apparatus must be used. Thus a conventional woodworking machine becomes large in size as a whole and complicated in structure as well.

A prior art woodworking machine, such as a duplicating router or the like, uses a feed motion wherein a cutter unit is fed vertically and horizontally by a screw feed mechanism. The feed motion depends on a stopper or other means available for shift control of the cutter unit. However, in the case of a duplicating woodworking machine, the fact is that the stopper is not particularly provided as a guide pin is kept creeping along an inner peripheral surface of a duplicating recessed groove and others.

That is, in the duplicating woodworking machine, the guide pin is fed by the screw feed mechanism to the duplicating recessed groove and others for duplicating.

However, in case the guide pin by the screw feed mechanism is fed to the duplicating recessed groove and others merely for duplicating, a high precision will be required for operating a feed screw rod. Also, an unreasonable effect may result on a duplicating part due to excessive turning of the feed screw rod, thus unexpectedly damaging the duplicating part. In case an ordinary working is performed without using the duplicating part, a feed of the cutter unit is capable of causing an erroneous operation, thus degrading the working precision.

A duplicating router has been disclosed by Wirth, Jr. in U.S. Pat. No. 4,593,735. A router with a horizontal shaft and supported on a frame is disclosed by Strong in U.S. Pat. No. 4,163,465.

SUMMARY OF THE INVENTION

To solve the aforementioned problem an object of the present invention is to simplify the structure and enhance the duplicating accuracy through an arrangement wherein a cutter unit can be fed quickly and smoothly vertically and also fed precisely horizontally.

To solve the aforementioned problem associated with the feed screw, another object of the invention is to simplify and facilitate an operation for feeding a cutter unit on a feed screw rod so that a duplicating part will operate smoothly and no damage will result thereon even from excessively turning the feed screw rod, and in case an ordinary working is performed without using the duplicating part, an erroneous operation will never be caused by the cutter unit.

In the duplicating router of the invention, a cutter unit is provided with a motor and a cutter mounting chuck on a horizontal shaft interlocked therewith. The cutter is fed vertically and horizontally with reference to a base. According to the invention, a cutter unit feeding screw rod is installed parallel with guide bars and is rotatable for operation on a vertical guide frame formed by framing left and right guides fitted movably up and down in elongate guide grooves provided opposite each other on vertical guide plates fixed on both sides of the base. Two parallel guide bars support the cutter unit movably left and right. A screw feeding means is thereby formed for feeding the cutter unit horizontally. A link handle is coupled to a link motion with its one end journaled in the base through a support shaft and the other end pivoted on the left and right guides, thereby forming a link feeding means for the vertical feed. Further, a template is fixed on upper portions of the vertical guide plates. A duplicating recessed groove is formed on side portions thereof in the direction perpendicular to an upper surface of the base. A guide pin holder is provided upright from the cutter unit to form a guide pin parallel with the horizontal shaft of the cutter unit and fit in the duplicating recessed groove, thus solving the aforementioned problem.

The invention further provides a feed motion for a duplicating router. This part of the invention comprises a cushioning material such as compression spring or the like disposed on a bearing part of a feed screw rod for feeding the cutter unit by its rotation on a horizontal guide of a vertical guide frame disposed movably up and down on a vertical guide plate fixed on both sides of the base. The compression spring is also disposed on the cutter unit or vertical guides through a feed nut, guide boss or the like. An initial pressure is applied in a feed direction of the feed screw rod or the cutter unit, thereby solving the aforementioned problem.

BRIEF DESCRIPTION OF THE DRAWINGS

FIG. 6 and 7 are transverse sectional views of alternative embodiments of the feed motion mechanism taken on line VI—VI in FIG. 2.

FIGS. 8 and 9 are a transverse sectional view and a side view representing a yet further embodiment of the feed motion mechanism.

FIG. 10 is a perspective view of a guide boss and a lock pin of the embodiment of FIGS. 8 and 9.

DETAILED DESCRIPTION OF PREFERRED EMBODIMENT

Figure 1:
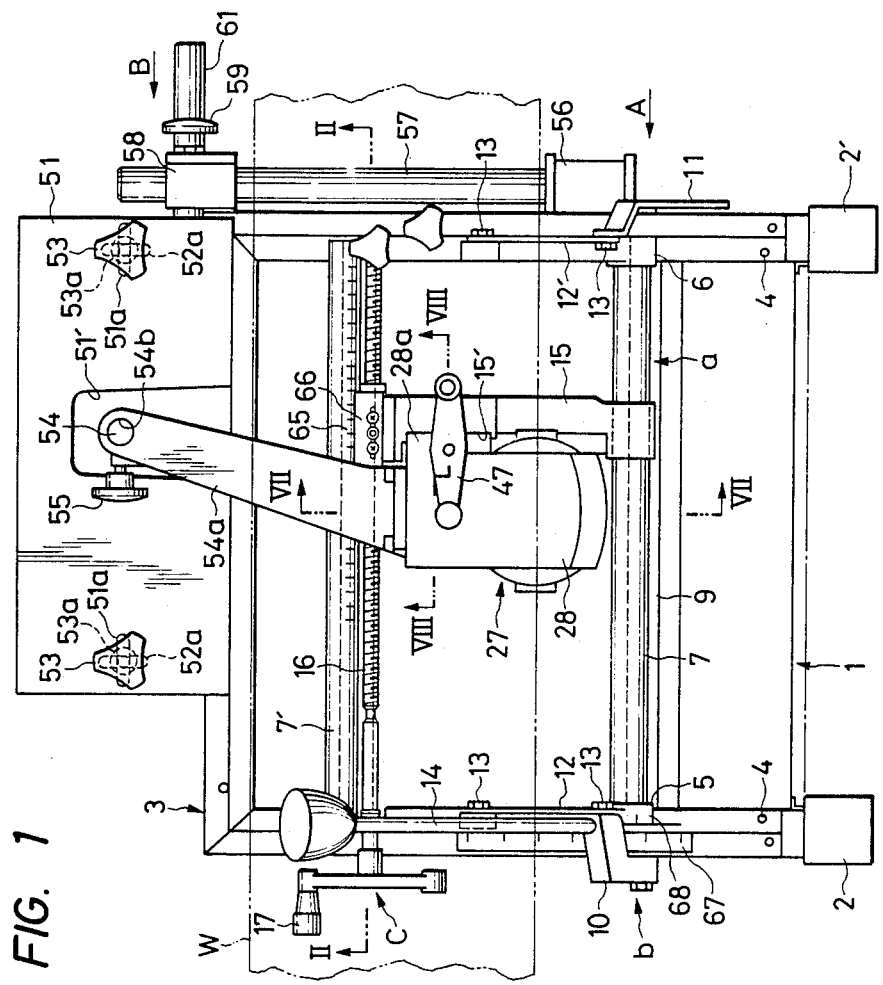
FIG. 1 is a front view of a duplicating router in one embodiment of the invention.

A first embodiment of the invention is now described with reference to the accompanying drawings of FIG. 1 to FIG. 6. As shown from the front in FIG. 1, from the left side in FIG. 2 and from above in FIG. 3, a vertical guide plate 3 of almost inverted U-shape in front view extends orthogonally with respect to a base upper surface 1a. The guide plate 3 is fixed upright with bolts 4 on both left and right sides of a base 1 mounted on blocks 2 and 2' fixed on lower portions of both its left and right sides.

As shown best in FIG. 6, guide grooves 3a and 3b of almost sidewardly facing U-shaped in cross section are provided longitudinally opposite and parallel to each other on both left and right sides of the vertical guide plate 3. Vertical guides 5 and 6 are fitted in the guide grooves 3a and 3b orthogonally to the base upper surface 1' and slide up and down without lost motion.

Two parallel guide bars 7 and 7' shown additionally in FIG. 1, are fixed on the vertical guides 5 and 6 with spring pins or the like to frame an integral vertical guide frame.

A support shaft 9, shown next to the lower guide bar 7 in FIG. 1, is laid rotatably and parallel with the guide bars 7 and 7' at an appropriate portion of the base 1. Ends of link levers 10 and 11 are fixed on both ends of the support shaft 9. The one link lever 10 on the left and the left vertical guide 5 are pivoted with the other link lever 11 on the right and the right vertical guide 6 through links 12 and 12' respectively with link pins 13 to form a link motion b'. A link handle 14 is mounted at an appropriate portion of the left link lever 10, thus forming the vertical guide frame a, or a link feeding means b for feeding the cutter unit vertically, which will be described later.

As shown in FIGS. 1 and 6, a bracket 15 is mounted to slide left and right, externally on both the guide bars 7 and 7' of the vertical guide frame a. Both ends of a feed screw rod 16 with a handle 17 fixed on one end with a screw 18 are rotatably supported on the vertical guides 5 and 6 closely in parallel with the upper guide bar 7'. There is thereby formed a screw feeding means c for horizontally feeding the bracket 15, as well as the cutter unit supported on the bracket 15 as will be described later.

The left vertical guide 5 supports through a retaining ring 19 and a thrust washer 20 a base end side of the feed screw rod 16, as shown for the embodiment in FIG. 6, so as not to shift axially. A nose portion is inserted in the right vertical guide 6. The feed screw rod 16 is prevented from rotating by tightening a knob screw 21 provided on the right vertical guide 6.

The feed screw rod 16 and the bracket 15 are screw coupled such that, as shown in FIG. 6, a feed nut 22 provided externally of the feed screw rod 16 is inserted in a keyway hole 15a passing through the bracket 15 and is disposed to be slidable axially but prevented from rotating by a key 23. Retaining rings 25 and 25' are fixed on both ends of the feed nut 22. Compression springs 24 are provided externally of the feed nut 22 at both ends for compressive holding. One end of each compression spring 24 is supported by the retaining ring 25 or 25' and the other end is simultaneously supported on the end 15b of the keyway hole 15a and also on the stepped end 22a or 22b of the feed nut 22. An initial pressure is applied in a feed direction of the feed nut 22 and the bracket 15, thereby forming a mechanical cushion d. The bracket 15 and the feed screw rod 16 are thus coupled through the mechanical cushion d. Then, the key 23 is pushed and thus fixed by a setscrew 26.

That is, the feed nut 22 and the bracket 15 are together shifted left or right by rotating forward or in reverse the feed screw rod 16 by the handle 17. When the bracket 15 is shifted left or right, then the guide pin of a cutter unit to be described later comes in contact with the inside edge of a recessed duplicating groove of a template which will be described later. Thus, the bracket 15 is prevented from shifting further left or right. In this contacting against the side of the duplicating groove, the feed nut 22 shifts slightly left or right against a pressure of one of the compression springs 24 and thus absorbs an impulsive force of the guide pin against the duplicating groove in elastic contact, thus permitting the cutter unit to smoothly shift horizontally. Then, when the one compression spring 24 is compressed as described above, the other compression spring 24 merely shifts on the feed nut 22.

The key 23 of the mechanical cushion d is pushed and fixed by a setscrew 26 screwed in a tapped hole 15d in the bracket 15. The setscrew 26 prevents a mutual sliding of the bracket 15 and the feed nut 22. In the case in which the key 23 is fixed by the setscrew 26, the mechanical cushion d no longer functions as a cushion.

FIG. 7 represents another embodiment of the invention with respect to the support and locking of the feed screw rod. The feed screw rod 16 is screwed into a tapped hole 15e passing through the bracket 15. The bracket 15 and the feed screw rod 16 are thus coupled to each other. A base end portion of the feed screw rod 16 is supported by the left vertical guide 5 as described below.

Namely, a guide boss 27 is mounted rotatably on the base end portion of the feed screw rod 16. An axial shift is prevented by two retaining rings 30 fitted on the feed screw rod 16. The guide boss 27 is inserted in a fitting hole 28 passing through the vertical guide 5 so as to be rotatable and movable in an axial direction. The compression spring 24 and the like are disposed with one end supported on retaining rings 29 provided on both ends of the guide boss 27 while another end is concurrently supported on stepped portions 27a or 27b provided on the guide boss 27 and on stepped portions 28a or 28b provided on an inside of the fitting hole 28. An initial pressure is applied in a cutter unit feed direction of the feed screw rod 16 through the guide boss 27.

Then, the feed screw rod 16 can be fixed for rotation and axial shift by the setscrew 26 provided on the vertical guide 5.

FIGS. 8, 9 and 10 represent yet a further embodiment of the invention with respect to the feed screw rod.

A collar 31 and the guide boss 27 acting internally are mounted on a base end side of the feed screw rod 16. With both the two placed next to each other coaxially, an axial shift is prevented by the retaining rings 19 rotatably coupled to the collar 31 and the guide boss 27 through the thrust washers 20.

An end side of the guide boss 27 placed opposite to the collar 31 is formed, as shown in FIG. 10, with a small end 27c. The compression coil spring 24 or the like which is somewhat larger than the outside diameter of the guide boss 27 and the collar 31 is pushed and so mounted on the small end 27c of the guide boss 27. The guide boss 27 and the collar 31 are inserted in a fitting hole 32 passing through the left vertical guide 5. The compression spring 24 is fitted in a U-groove 33 provided in a part of the fitting hole 32 of the same size as an outside diameter of the compression spring 24 to have both the end supported thereon. An initial holding pressure is applied to the feed screw rod 16.

Then, a through hole 32 orthogonal to the feed screw rod 16 is provided on the left vertical guide 5 and a lock pin 35 is inserted therein. The lock pin 35 is biased toward the guide boss 27 by a coil spring 37 positioned to have its ends pressing against a retaining ring 36 and an outside wall 5a of the vertical guide 5.

A nose of the lock pin 35 is formed into a projection 35a so as to function as a key. Orthogonal recessed grooves 27d and 27e, one lying in the axial direction and the other in the circumferential direction, are provided on an outer periphery of the guide boss 27 so as to be selectively engaged with the projection 35a, thus regulating the turning and axial shift of the guide boss 27.

Then, a pin 38 is perpendicularly fixed on the lock pin 35. A stopper 39 formed on the surface of the outside wall 5a of the vertical guide 5 controls an angle of rotation of the pin 38 at a position where the projection 35a of the lock pin 35 is fitted selectively in one of the recessed grooves 27d and 27e.

Figure 11:
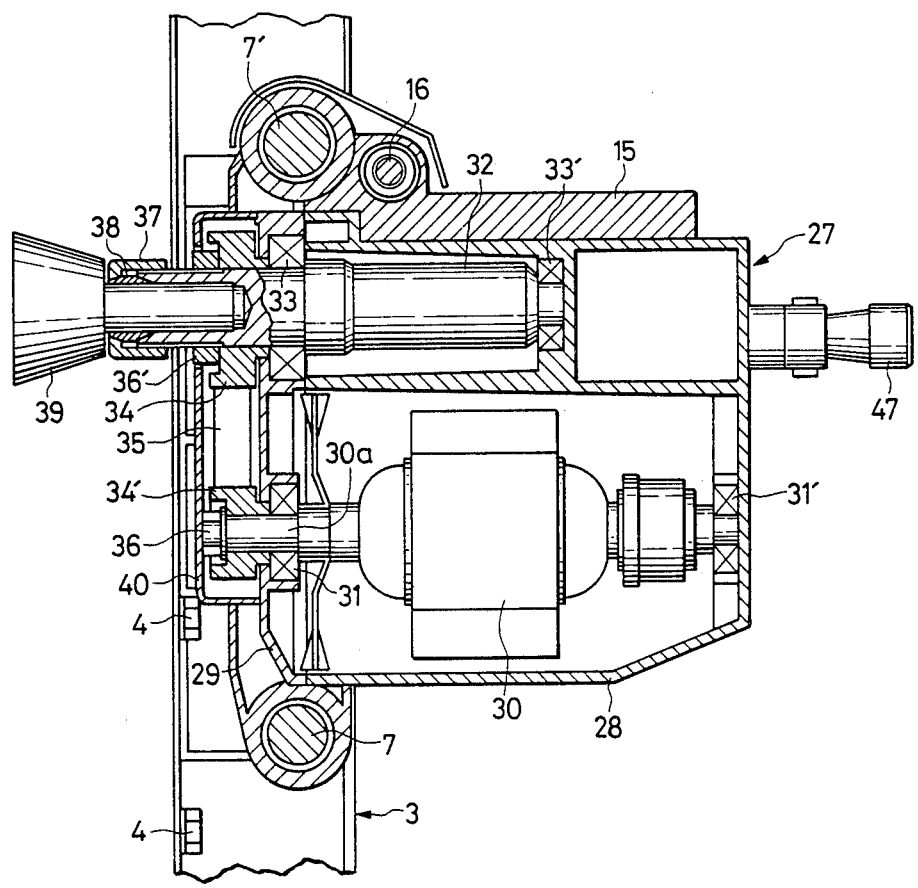
FIG. 11 and FIG. 12 are enlarged sectional views taken on line XI—XI and XII—XII in FIG. 1 respectively.
Figure 12:
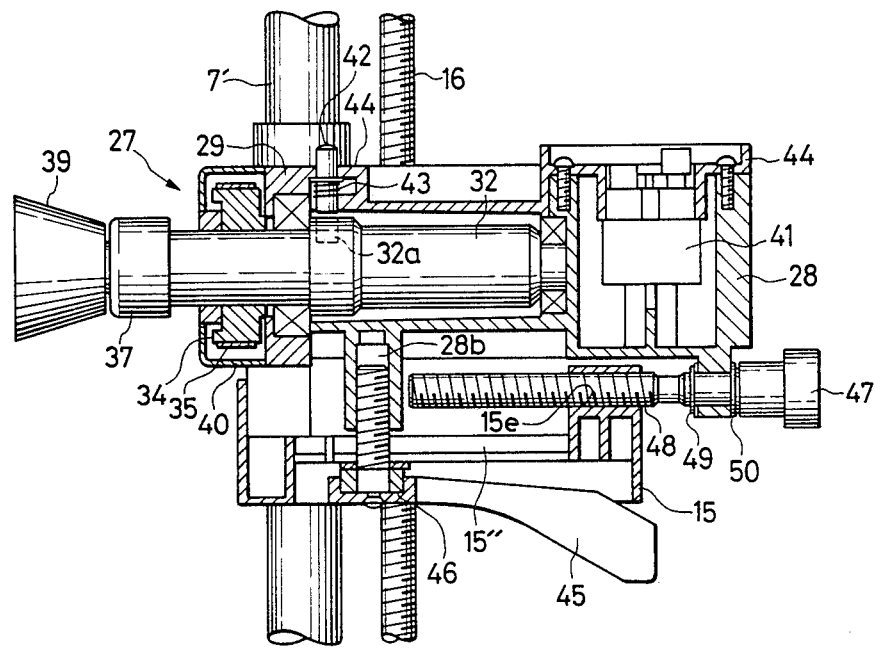
Figure 13:
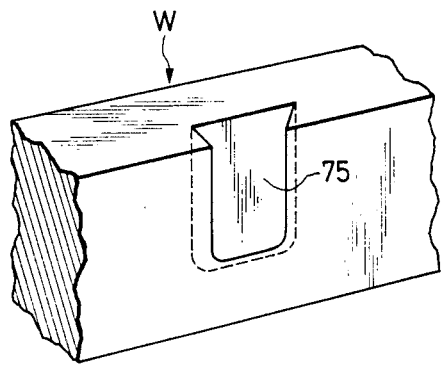
FIG. 13 is a perspective view of a workpiece showing an example for duplicating.

Then, as shown in FIG. 1, a cutter unit 27 is supported on the bracket 15 of the vertical guide frame a for ready longitudinal shifting by operation of a handle 47. The cutter unit 27 is formed as follows. As shown in FIG. 11 and FIG. 12, a motor shaft 30a is supported rotatably in a motor case 28 and a motor cover 29 by bearings 31 and 31'. Thus, a motor 30 is mounted internally of the motor case 28 and the motor cover 29. A horizontal shaft 32 is rotatably supported in the motor case 28 and the motor cover 29 by other bearings 33 and 33' in parallel with the motor shaft 30a. A belt 35 is wound on pulleys 34 and 34' fixed on the horizontal shaft 32 and the motor shaft 30a respectively. Thus, the horizontal shaft 32 is driven by the motor 30.

A collet nut 37 and a collet chuck 38 are provided on a nose portion of the horizontal shaft 32 so as to detachably hold a cutter 39 such as bit or the like. The pulleys 34 and 34' and the belt 35 are covered with a belt cover 40 screwed on the motor cover 29 and thereby separated from the cutter 39.

A switch 41 for switching current to the motor is provided on the motor case 28. A lock pin 42 slides through a retaining ring 44 and is biased by compression spring 43 in a direction orthogonal to the horizontal shaft 32. The compression spring 43 urges the pin 42 into the engaging hole 32a provided on the horizontal shaft 32, thereby preventing rotation of the horizontal shaft 32.

As shown in FIG. 1, a projection 28a orthogonal to the guide bars 7 and 7' is provided on an outside portion of the motor case 28 parallel with the horizontal shaft 32. The bracket 15 includes a recess 15' slidably fitted with the projection 28a. The recess 15' includes, as shown in FIG. 12, and elongated aperture 15" at its central portion in parallel with the direction in which the projection 28a slides. A clamp screw 46 with a lever 45 which is screwed in a tapped hole 28b provided on the motor case 28 is inserted in the elongated aperture 15". The motor case 28 is controllably fixed on the bracket 15 by the clamp screw 46 for sliding longitudinally within the range of an effective length of the elongated aperture 15".

A radial feed screw 48 with the handle 47 is supported rotatably with an axial move prevented on the motor case 28 through a retaining ring 49 and a thrust washer 50. The radial feed screw 48 is screwed in a tapped hole 15e provided on the bracket 15. Thus, the cutter unit 27 controllably shifts the horizontal shaft 32 axially or longitudinally by an operation of the handle 47.

Figure 2:
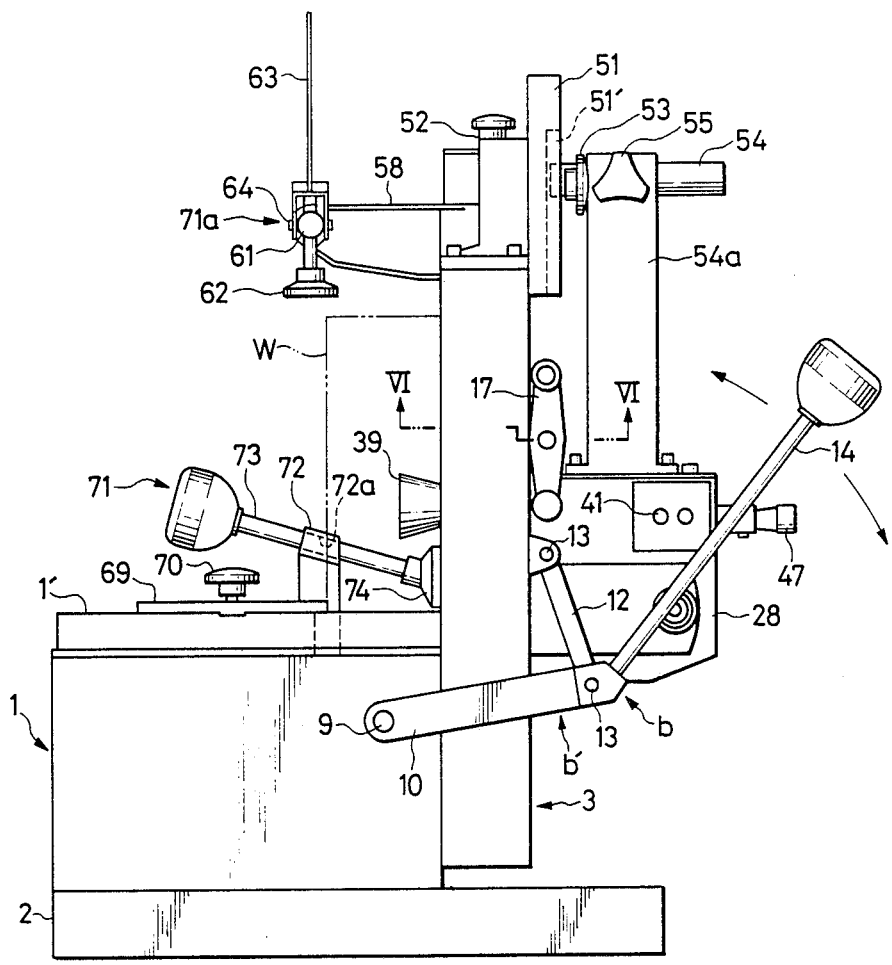
FIG. 2 is a left side view of the embodiment.

Further, a template holder 52, shown in side view in FIG. 2, is fixed on an upper portion of the vertical guide plate 3 with screws 52a. A template 51 is fixed on the template holder 52 through tightening knob screws 53 and nuts 53a.

Here, two elongated apertures 52a extend vertically on the template holder 52 and two other elongated apertures 51a orthogonal to the vertical apertures 52a extend horizontally on the template 51. The knob screw 53 is inserted in both elongated apertures 52a and 51a and the nut 53a is screwed thereon, thereby controlling the template 51 for vertical and horizontal movement relative to the template holder 52.

A duplicating recessed groove 51', or curved portion, is formed on the front of the template 51 in a shape which is almost "U" shaped from the front, for example, as illustrated in FIG. 1. Other shapes may be used corresponding to that for working.

On the other hand, a guide pin bracket 54a is fixed with a screw or the like and extends upright on the top of the motor case 28 in the cutter unit 27. A guide pin 54 passes longitudinally through the guide pin bracket 54a and is inserted in a fitting hole 54b. The guide pin 54 is fixed on an upper portion of the guide pin bracket 54a for adjustable sliding in the longitudinal direction as controlled with a knob screw 55. The path of the guide pin 54 is restricted by its fit in the duplicating recessed groove 51'.

Then, as shown in FIG. 1, a vise holder 56 is fixed on one side of the base 1 and a vise bar 57 extends vertically thereon. A vise bracket 58, shown also in FIG. 2, is fixed with a knob screw 59 on an upper portion of the vise bar 57 with its one end slidable vertically and also horizontally rotatable.

A vise bar 61 (seen from the top in FIG. 3) passing horizontally through a fitting hole 58a of the vise bracket 58 is slidable horizontally but may be fixed with a knob screw 60 on another end of the vise bracket 58.

Figure 5:
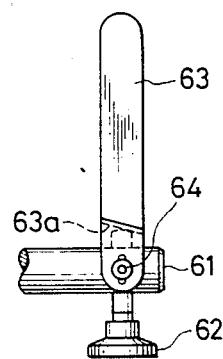
FIG. 5 is a side view taken in the direction B of FIG. 1.

As shown in FIGS. 2 and 5, a vise 62 and a rotatable vise lever 63 are retained with a pin 64 on the free end of the vise bar 61 which extends almost in the direction of the central portion of the base upper surface 1'. A head of the vise 62 can be pushed downward on an inclined plane 63a provided on the vise lever 63 by turning the vise lever 63. There is thereby formed a vise means 71a used selectively for pushing and holding a workpiece placed on the base upper surface 1'.

Then, a fixed horizontal scale plate 65 is laid between the two legs of the vertical guide plate 3. A movable horizontal scale indicator 66 is provided on the bracket 15 corresponding to the fixed horizontal scale plate 65. A fixed vertical scale plate 67 is provided on the left leg of the vertical guide plate 3. A movable vertical scale indicator 68 is provided on the vertical guide frame a corresponding to the fixed vertical scale plate 67.

Figure 3:
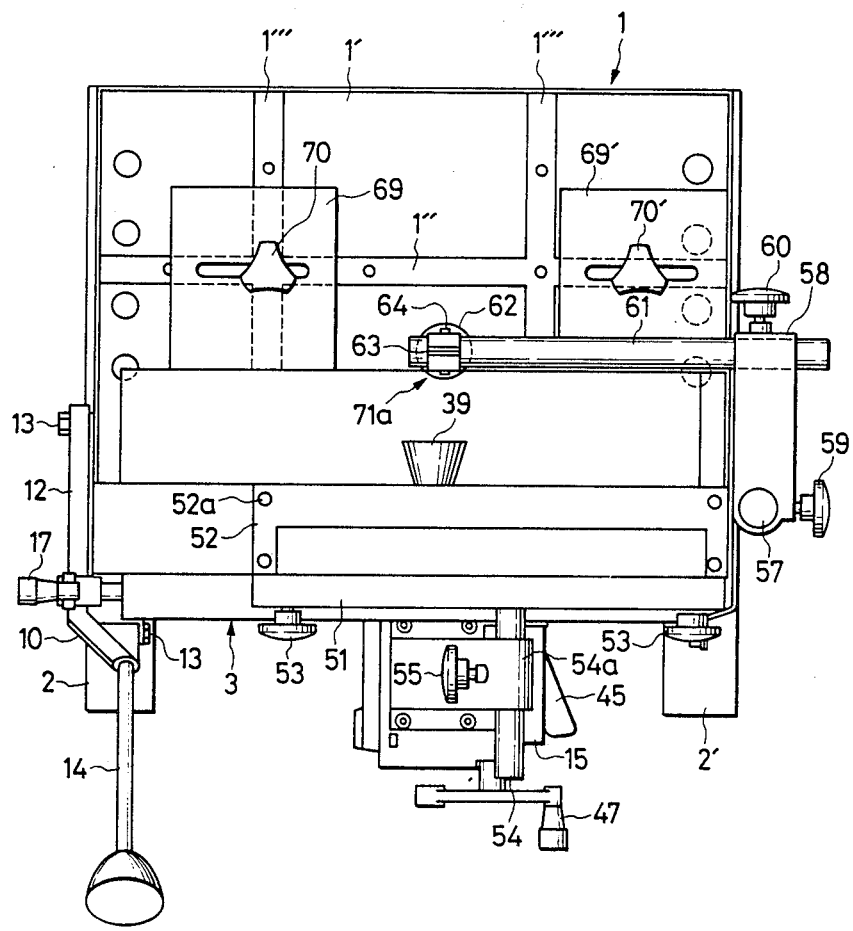
FIG. 3 is a plan view of the embodiment.
Figure 4:
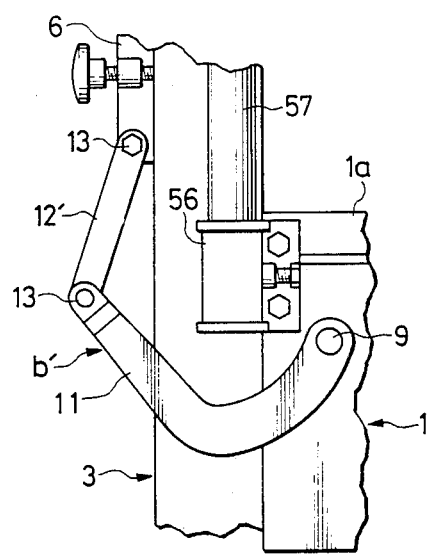
FIG. 4 is a side view taken in the direction A of FIG. 1.

Further, as shown in FIG. 3, a plurality of recessed grooves are made in the upper surface of the base 1, so as to be parallel with or orthogonal to the horizontal guide bars 7. Guide plates 69 and 69' are fixed from sliding with knob screws 70 and 70' in the recessed groove 1b, 1c and 1d thus placing workpieces of variable width in position and also functioning as an auxiliary vise.

Then, another vise means 71, shown in FIG. 2, separate from the vise means 71a, pushes and holds the workpiece W onto the front of the vertical guide plate 3 from the side.

As shown in FIG. 3, the additional vise means 71 is constructed such that a plurality of fitting holes 1e are spaced one from the other properly in longitudinal rows on both the left and right sides of the base upper surface 1a so as to be orthogonal to the base upper surface 1a. As shown in FIG. 2, a lower end of a vise holder 72 is fitted and so held in a selected fitting hole 1e. A vise screw 73 is inserted in a tapped hole 72a passing longitudinally through the vise holder 72. The workpiece W is fastened and held against the vertical guide plate 3 by a vise 74 supported rotatably on a nose of the vice screw 73.

Then in the above-described construction, when working, for example, a dovetail groove 75 exemplified in FIG. 12 on the workpiece W, the workpiece W is placed on the base upper surface 1a. The workpiece W is clamped to the base upper surface 1a by means of the vise means 71 or 71a. However, the link handle 14 of the link feeding means b is turned downward, in advance thereto, to lower the vertical guide frame a and the cutter unit 27 to a position where the cutter 39 such as bit or the like comes lower than the base upper surface 1'. The workpiece W is clamped as mentioned, and then the motor 30 is started up by operating the start-step switch 41. Next, simultaneously the link handle 14 of the link feeding means b is turned upwards (counter to its previous movement) in order to raise the cutter 27 vertically and the handle 17 of the screw feeding means c is rotated to feed the cutter 27 horizontally. Thereby, the guide pin 54 is shifted along an inner peripheral surface of the duplicating recessed groove 51', thereby working the dovetail groove 75 of FIG. 23 on a side of the workpiece W which corresponds to a shape of the duplicating recessed groove 51' on the template 51.

In this case, where the handle 17 of the screw feeding means b is turned excessively, the mechanical cushion d will absorb an axial impulsive force of the feed screw rod 16. Therefore, the guide pin 54 is shifted as it continues to be pushed to an inner peripheral surface of the duplicating recessed groove 51'.

That is, if the feed screw rod 16 is turned excessively, then the compression spring is elastically deformed and thus an excessive feed of the cutter unit 28 is absorbed. Therefore the guide in 54 will not run strongly against the inner peripheral surface of the duplicating recessed groove 51'. The guide in 54 is brought into elastic contact with the inner peripheral surface of the duplicating recessed groove 51' on the repulsion of the spring 24, thus smoothing the way for duplicating.

Then, since the guide pin 54 is shifted vertically in the duplicating recessed groove 51' by manually operating the link handle 14 of the link feeding means b, the guide pin 54 can at all times be pushed (while being moderately loaded) to the inner peripheral surface 51' of the duplicating recessed groove 51'.

As described in detail above, in the duplicating router of the invention, the cutter unit 27 can be fed vertically quickly and smoothly by turning the link handle 14 of the link feeding means means b. Furthermore, the guide pin 54 will thereby be pushed under a moderate load at all times to the inner peripheral surface of the duplicating recessed groove 51'. A precise horizontal feed can be realized by the screw feeding means c as well. Therefore, a biaxial duplicating operation can be performed easily and precisely. Thus, an enhancement in duplicating precision may be secured by using the router of the invention in a simple operation. Moreover, the arrangement is such that the link feeding means b is available for vertical feeding to say nothing of the screw feeding means c for horizontal feed. Therefore, a feeding means of the cutter unit 27 can be simplified. Also, the duplicating recessed groove 51' can be formed simply through fixing the template 5 on an upper portion of the vertical guide plate 3, thus ensuring an effect in attaining simplification and miniaturization of the duplicating router.

The feed motion, for the duplicating router and the like according to the invention is constructed as described above. Therefore in case the cutter unit 28 is fed for duplicating work patterns by operating the screw feed part c, the cutter unit 28 can be fed without any trouble for normal operation since an initial pressure is already applied by the compression spring 24 in a feed direction of the feed screw rod 16 and of the cutter unit 28. If the feed screw rod 16 is turned excessively, then the compression spring 24 is further compressed and an excessive feed of the cutter unit 28 is thus absorbed. The guide pin 54 elastically contacts the inner peripheral surface of the duplicating recessed groove 51' against a repulsion of the compression spring 24. Therefore, the guide pin 54 can be shifted to be kept in contact at all times with the inner peripheral surface. Consequently, a high precision will not particularly be required for the rotating operation of the feed screw rod 16. An operation for feeding the cutter unit 28 can thus be simplified and facilitated, and an unreasonable force such as impulsive force or the like will not work on the duplicating part. Therefore, the duplicating part can be prevented from being damaged. In case a usual working operation is performed without using the duplicating part, an erroneous operation of the cutter unit 28 can also be prevented by checking an axial move of the feed screw rod 16 with the setscrew 26 or lock pin.

What is claimed is:
1. A duplicating router, comprising:
 a base;
 vertical guide plates fixed on both sides of said base;
 a vertical guide frame guided by said vertical guide plates and disposed movably up and down on said vertical guide plates;
 a horizontal guide connected to said vertical guide frame;
 a cutter unit movably disposed left and right on said horizontal guide, said cutter unit comprising a motor and a cutter mounting chuck on a shaft connected to said motor;
 a bracket mounting said motor;
 a template fixed on an upper portion of said vertical guide plates, including a curved portion formed in said template;
 vertical feeding means for vertically moving said vertical guide frame;
 screw feeding means for feeding said cutter unit horizontally in a feed direction and including a feed screw rod feeding said cutter unit; and
 a cushion material disposed in said screw feeding means at a point mechanically between said screw feeding means and one of said cutter unit and said vertical guide frame, a pressure being applied against said feed direction of said feed screw rod to said cushion material.

2. A duplicating router as recited in claim 1, wherein said screw feeding means includes a threaded member having a threaded portion engaging said feed screw rod, said router further comprising a bracket supporting said cutter unit, and wherein said cushion material is disposed between said bracket and said threaded member.

3. A duplicating router as recited in claim 1, further comprising a guide boss (27) and a collar 31 mounted on a base end side of said feed screw rod (16), and wherein said cushion material is disposed between said vertical guide frame and said guide boss.

4. A duplicating router as recited in claim 3, wherein said boss includes a circumferential groove on an outer surface thereof and further comprising a pin fixed in said vertical guide frame in an axial direction of said feed screw rod and selectively engageable with said circumferential groove.

5. A duplicating router, comprising:
   a base;
   vertical guide plates fixed on both sides of said base and including vertical elongate guide grooves opposing each other;
   a vertical guide frame having right and left guides disposed movably up and down in said guide grooves on said vertical guide plates and including two parallel horizontal guide bars;
   a feed screw parallel to said horizontal guide bars;
   a cutter unit movably disposed on said horizontal guide bars and fed by said feed screw, said cutter unit comprising a motor and a cutter mounting chuck on a shaft connected to said motor;
   a template fixed on an upper portion of said vertical guide plates, including a curved portion formed in said template;
   screw feeding means for feeding said cutter unit horizontally in a feed direction and including said feed screw rod feeding said cutter unit;
   a guide pin projecting from said cutter unit in a direction parallel to a horizontal shaft of said chuck and engageable with said curved portion of said template;
   a link handle having one portion coupled in a link connection to said base and having another portion pivoted on said right and left guides, thereby providing a link feeding means for vertical feed of said vertical guide frame; and
   a cushion material disposed in said screw feed means at a point mechanically between said cutter unit and said vertical guides, an initial pressure being applied in said feed direction of said feed screw rod to said cushion material.

6. A duplicating router as recited in claim 5, wherein said feed screw rods is supported by said guides.

7. A duplicating router as recited in claim 5, wherein said screw feeding means comprises a guide boss (27) and a collar (31) mounted on a base end side of said feed screw rod, and said cushion material is disposed between said guide boss and said vertical guide frame.

8. A duplicating router as recited in claim 1, further comprising a boss provided in a fixed axial position on said feed screw rod, and wherein said cushion material is disposed between said vertical guide frame and said boss.

9. A duplicating router as recited in claim 7, wherein said boss includes a circumferential groove on an outer surface thereof and further comprising a pin fixed in said vertical guide frame in an axial direction of said feed screw rod and selectively engageable with said circumferential groove.

* * * * *